United States Patent
Horen

(10) Patent No.: US 8,357,049 B2
(45) Date of Patent: Jan. 22, 2013

(54) FLUID TRANSFER TUBE

(75) Inventor: Jezrah E. Horen, Fairland, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 3 days.

(21) Appl. No.: 13/013,503

(22) Filed: Jan. 25, 2011

(65) Prior Publication Data

US 2011/0124422 A1 May 26, 2011

Related U.S. Application Data

(62) Division of application No. 11/937,943, filed on Nov. 9, 2007, now Pat. No. 7,878,911.

(51) Int. Cl.
*F16C 1/24* (2006.01)
(52) U.S. Cl. .......................................................... 464/7
(58) Field of Classification Search ................ 464/7, 16, 464/18, 183; 138/114–116; 184/6.17, 6.18
See application file for complete search history.

(56) References Cited

U.S. PATENT DOCUMENTS

| | | | |
|---|---|---|---|
| 425,324 A | 4/1890 | Howell | |
| 3,267,695 A | 8/1966 | Toelke | |
| 6,422,948 B1 | 7/2002 | Murakami | |
| 6,511,379 B2 | 1/2003 | Bondioli | |
| 6,634,388 B1 * | 10/2003 | Taylor et al. | 138/114 |
| 6,726,571 B2 | 4/2004 | Ferriman et al. | |
| 7,878,911 B2 | 2/2011 | Horen | |
| 7,938,147 B2 * | 5/2011 | Anderson et al. | 138/114 |
| 8,025,081 B2 * | 9/2011 | Poskie et al. | 138/114 |
| 2006/0191746 A1 * | 8/2006 | Diosi et al. | 184/6.18 |

FOREIGN PATENT DOCUMENTS

| | | |
|---|---|---|
| CN | 1820156 A | 8/2006 |
| WO | WO 01/07762 A1 * | 2/2001 |

* cited by examiner

*Primary Examiner* — Gregory Binda

(57) ABSTRACT

A torque-transfer assembly includes a fluid transfer tube located within a bore of a shaft. The fluid transfer tube seals to the shaft and includes at least one fluid groove that communicates between a plurality of fluid ports located in the shaft. The fluid groove is defined by an outer surface of the fluid transfer tube.

15 Claims, 3 Drawing Sheets

FLUID TRANSFER TUBE

CROSS-REFERENCE TO RELATED APPLICATIONS

This patent application is a divisional of U.S. Application Ser. No. 11/937,943 filed on Nov. 9, 2007, now U.S. Pat. No. 7,878,911. The disclosure of the above application is incorporated herein by reference.

FIELD

The present disclosure relates to a device for transferring fluid, and more particularly to a fluid transfer tube for a component in a transmission.

BACKGROUND

The statements in this section merely provide background information related to the present disclosure and may or may not constitute prior art.

Automatic transmissions typically include a hydraulic circuit or system that uses a hydraulic fluid, such as oil, for various purposes throughout the transmission. For example, the hydraulic system may direct oil to various transmission components to act as lubrication between moving components, to act as a cooling system for dissipating waste heat, and to act as a hydraulic control system for actuating various devices.

In many applications it may be desirable to transmit fluid along the length of a shaft, such as a turbine shaft or input/output shaft. However, these shafts are preferably hollow to reduce weight and cost since most of the strength of the shaft is provided by the outer diameter of the shaft, thereby making interior material unnecessary. Various methods have been employed to transmit fluid along the length of a shaft, such as non-concentric bore holes and multiple sleeves. While useful for their intended purpose, there is a need for a device to transmit hydraulic fluid through a shaft that reduces weight, cost, and packaging size while remaining simple and effective.

SUMMARY

A torque-transfer assembly includes a fluid transfer tube located within a bore of a shaft. The fluid transfer tube seals to the shaft and includes at least one fluid groove that communicates between a plurality of fluid ports located in the shaft. The fluid groove is defined by an outer surface of the fluid transfer tube.

One embodiment of the torque-transfer assembly includes a shaft having an inner surface that defines a bore, the bore defining an axis, wherein the shaft has a first fluid port that communicates a fluid to the bore and a second fluid port that communicates the fluid from the bore, wherein the first fluid port is located a distance along the axis from the second fluid port. A fluid transfer tube is located within the bore and coaxial with the axis, the fluid transfer tube having an outer surface sealingly engaged with the inner surface of the shaft, the outer surface defining a fluid groove having a length at least greater than the distance between the first fluid port and the second fluid port, the fluid groove parallel to the axis and in communication with the first fluid port and the second fluid port. The fluid communicates from the first fluid port through the fluid groove to the second fluid port.

In one aspect of the present invention, the fluid groove is defined by a curved surface indented into the outer surface of the fluid transfer tube.

In another aspect of the present invention, the fluid groove has a top surface defined by the inner surface of the shaft.

In yet another aspect of the present invention, the curved bottom surface of the fluid groove has a cross-sectional thickness equal to a cross-sectional thickness of the outer surface of the fluid transfer tube.

In yet another aspect of the present invention, the shaft includes at least six fluid ports and wherein the fluid transfer tube includes three fluid grooves, and wherein each of the fluid grooves is in fluid communication with at least two of the plurality of fluid ports such that fluid communicates from three of the six fluid ports through the three fluid grooves to another three of the six fluid ports.

In yet another aspect of the present invention, a first of the three fluid grooves has a depth and a width less than a depth and a width of a second and third of the three fluid grooves.

In yet another aspect of the present invention, the three fluid grooves are spaced equally circumferentially apart on the outer surface of the fluid transfer tube.

One embodiment of the fluid transfer tube for communicating fluid between a plurality of fluid ports in a shaft assembly includes a cylindrical outer surface sealingly engaged with the shaft assembly, the outer surface having three fluid grooves each defined by a curved indented surface on the outer surface, wherein each of the fluid grooves is in fluid communication with at least a pair of fluid ports in the shaft assembly. An inner surface defines a central passage coaxial with the shaft. A first end defines a first opening that communicates with the central passage. A second end defines a second opening that communicates with the central passage. Fluid flow communicates from one of the fluid ports in the shaft assembly, through one of the fluid grooves to another of the fluid ports in the shaft assembly.

In one aspect of the present invention, the three fluid grooves are spaced equally circumferentially apart on the outer surface of the fluid transfer tube.

In another aspect of the present invention, the curved indented surfaces of the fluid grooves have a cross-sectional thickness equal to a cross-sectional thickness of the outer surface.

In yet another aspect of the present invention, a first of the plurality of fluid grooves has a depth and a width less than a depth and a width of the other fluid grooves.

In yet another aspect of the present invention, a length of each of the fluid grooves is at least equal to a distance between the pair of ports that communicate with each of the fluid grooves.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
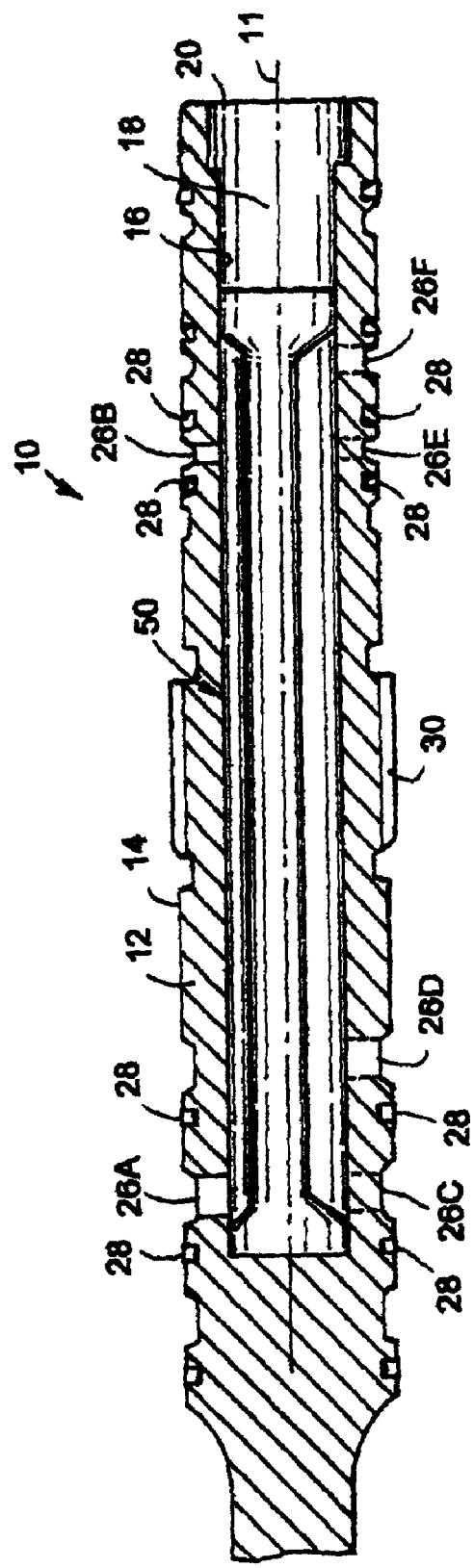
FIG. 1 is a cross-sectional view of an exemplary shaft assembly and a side view of an embodiment of a fluid transfer tube according to the principles of the present invention.

With reference to FIG. 1, an exemplary shaft or torque-transfer assembly is illustrated and indicated by reference number 10. In the example provided, the torque transfer assembly 10 is a turbine shaft assembly used in a transmission, however it should be appreciated that various other shafts may be employed without departing from the scope of the present invention. The torque transfer assembly 10 defines a linear axis 11 and includes a generally cylindrical shaft portion 12 having an outer surface 14 and an inner surface 16. The inner surface 16 defines a bore 18 that is coaxial to the axis 11. The bore 18 communicates with an opening 20 located in a terminal end of the shaft portion 12. The outer surface 14 includes a plurality of fluid ports, indicated by reference numbers 26A-26F, that communicate between the outer surface 14 of the torque transfer assembly 10 and the bore 18. The fluid ports 26A-F are preferably spaced along a length of the shaft portion 12, though the locations of the fluid ports 26A-F on the outer surface 14 may vary without departing from the scope of the present invention. Additionally, the number of fluid ports 26A-F may vary without departing from the scope of the present invention. The fluid ports 26A-F are operable to receive one or more fluid flows of a pressurized hydraulic fluid, such as oil. A plurality of radial seals 28 are sealingly engaged to the outer surface 14 and to a sleeve (not shown) or other structure that supports the torque transfer assembly 10. The radial seals 28 are located surrounding each of the fluid ports 26A-F to hydraulically isolate each of the fluid ports 26A-F. The outer surface 14 may include various other features, such as gear teeth 30 for engaging a gear (not shown), without departing from the scope of the present invention.

Figure 2:
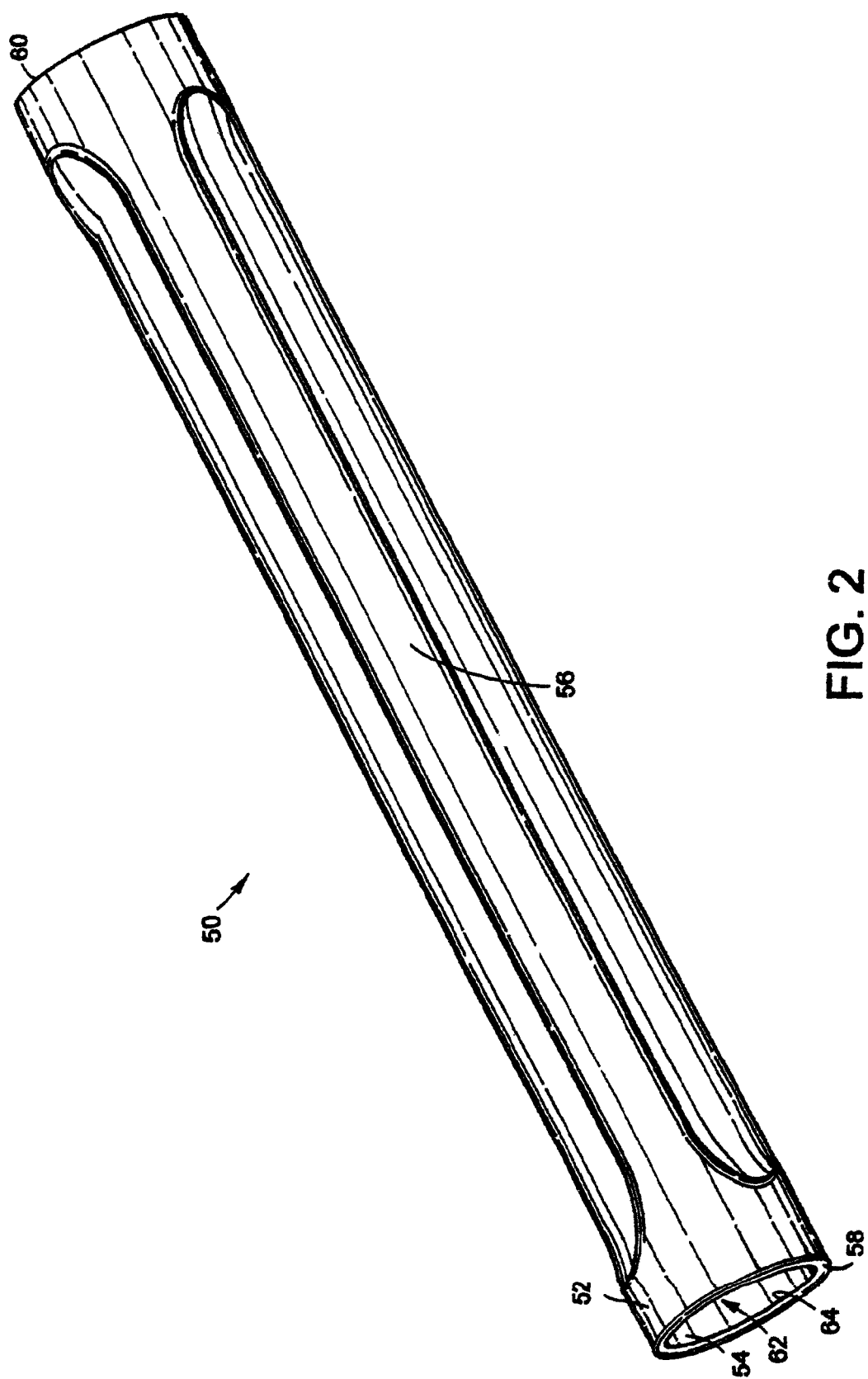
FIG. 2 is front perspective view of an embodiment of a fluid transfer tube according to the present invention.
Figure 3A:
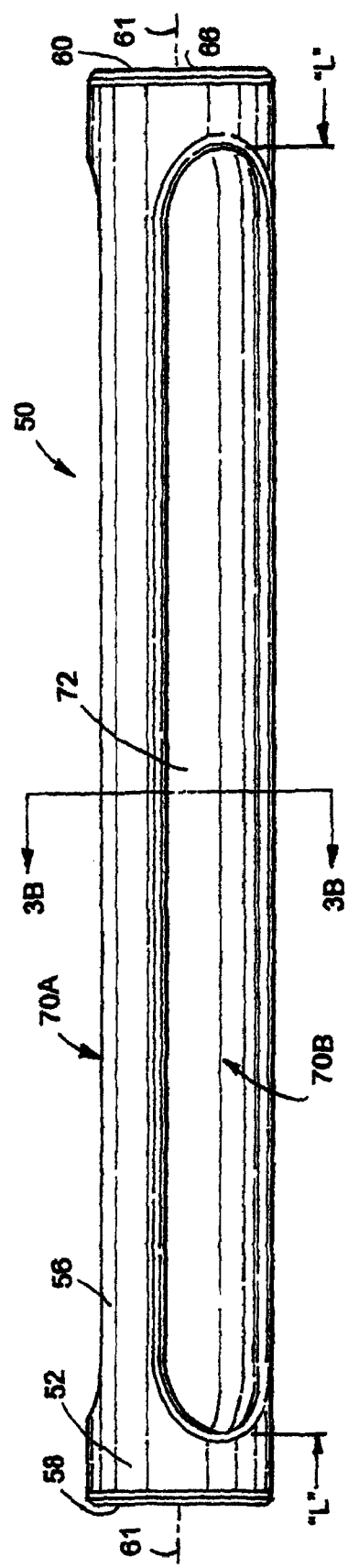
FIG. 3A is a side view of an embodiment of the fluid transfer tube of the present invention.

With reference to FIGS. 2 and 3A and continued reference to FIG. 1, a fluid transfer tube, generally indicated by reference number 50, is employed to transfer the hydraulic fluid flows between the fluid ports 26A-F. The fluid transfer tube 50 includes a generally cylindrical, tubular portion 52 having an inner surface 54, an outer surface 56, a first end 58, and a second end 60. The tubular portions 52 defines a longitudinal axis 61. The inner surface 54 defines a central passage 62 that is coaxial with the axis 61. The central passage 62 communicates with a first opening 64 located in the first end 58 and with a second opening 66 located in the second end 60.

Figure 4:
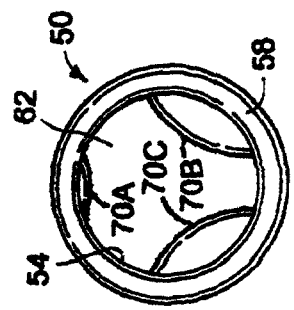
FIG. 4 is an end view of an embodiment of the fluid transfer tube of the present invention.
Figure 3B:
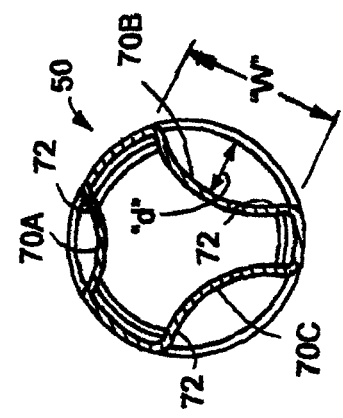
FIG. 3B is a cross-sectional view of an embodiment of the fluid transfer tube of the present invention taken in the direction of arrow 3B-3B in FIG. 3A.

With reference to FIGS. 3B and 4, the outer surface 56 defines a plurality of fluid grooves including a first fluid groove 70A, a second fluid groove 70B, and a third fluid groove 70C. The fluid grooves 70A-C extend parallel to the axis of the tubular portion 52. In the particular example provided, the fluid transfer tube 50 includes three fluid grooves 70A-C sized and spaced to communicate with the exemplary number and location of the fluid ports 26A-F in the torque transfer assembly 10, though any number of fluid grooves 70 may be included without departing from the scope of the present invention.

The fluid grooves A-C are each defined by a curved bottom surface 72 that is formed from indenting or pushing inward the outer surface 56 into the central passage 62. As best seen in FIG. 3B, the curved bottom surfaces 72 each have a constant thickness and a curved cross-sectional area. Additionally, the fluid grooves 70A-C have a top surface defined by the inner surface 16 of the shaft 12. The fluid grooves 70A-C extend into the tubular portion 52 to a predefined depth "d" and width "w" and have a predefined length "L". Accordingly, each of the fluid grooves 70A-C may have different depths and widths to accommodate various amounts of fluid flow and different lengths to accommodate the locations of the various fluid ports 26A-F, as will be described in further detail below. For example, the first fluid groove 70A has a smaller width "w" and depth "d" than the second and third fluid grooves 70B, 70C. Additionally, the fluid grooves 70A-C are spaced equally circumferentially apart along the outer surface 56 in the example provided.

The fluid transfer tube 50 is sized to be press fitted within the bore 18 of the torque transfer assembly 10. More specifically, the fluid transfer tube 50 is inserted within the bore 18 such that either the first end 58 or the second end 60 of the fluid transfer tube 50 abuts an end or stepped portion of the bore 18. As the fluid transfer tube 50 is pressed fitted in the bore 18, the fluid transfer tube 50 deflects which induces a compressive strain that seals the outer surface 56 of the fluid transfer tube 50 to the inner surface 16 of the torque transfer assembly 10. The fluid transfer tube 50 may be held in place by a snap ring (not shown), though various other methods of securing the fluid transfer tube 50 within the torque transfer assembly 10 may be employed without departing from the scope of the present invention.

In the particular example provided, the fluid transfer tube 50 is aligned or oriented with the shaft portion 12 such that the first fluid groove 70A is aligned and communicates with fluid ports 26A and 26B, the second fluid groove 70B is aligned and communicates with fluid ports 26D and 26F, and the third fluid channel 70C is aligned and communicates with fluid ports 26C and 26E. Furthermore, the curved surface of the first fluid groove 70A opposes the inner surface 16 of the shaft 14 to form a sealed fluid transfer passage between the first fluid port 26A and the second fluid port 26B. Accordingly, fluid flow entering one of the fluid ports 26A, 26C, 26D passes into a fluid groove 70A-C in communication with the fluid ports 26A, 26C, 26D and is communicated along the length of the fluid transfer tube 50 to exit at one of the fluid ports 26B, 26E, 26F. Therefore, the length "L" of any given fluid groove 70A-C is at least equal to the distance between any two fluid ports 26A, 26C, 26D and 26B, 26E, 26F that communicate with the given fluid groove 70A-C. It should be appreciated that the fluid flows may communicate in any direction through the torque transfer assembly 10 and the fluid transfer tube 50 without departing from the scope of the present invention.

The description of the invention is merely exemplary in nature and variations that do not depart from the gist of the invention are intended to be within the scope of the invention. Such variations are not to be regarded as a departure from the spirit and scope of the invention.

What is claimed is:

1. A torque-transfer assembly comprising:
   a shaft having an inner surface that defines a bore, the bore defining a shaft axis, wherein the shaft has a first, a second, a third, and a fourth fluid port in fluid communication with the bore, wherein the first fluid port is located a distance along the shaft axis from the second fluid port and the third fluid port is located a distance along the shaft axis from the fourth fluid port; and a fluid transfer tube having a longitudinal body that defines a tube axis located within the bore and coaxial with the shaft axis, the fluid transfer tube having an outer surface sealingly engaged with the inner surface of the shaft, wherein the outer surface includes a first indented fluid groove and a second indented fluid groove each parallel to the tube axis, wherein the first indented fluid groove is in fluid communication with the first fluid port and the second fluid port and the second indented fluid groove is in fluid communication with the third fluid port and the fourth fluid port, and wherein a depth and a width of the first indented fluid groove is different from a depth and a width of the second indented fluid groove.

2. The torque-transfer assembly of claim 1 wherein the first and second indented fluid grooves are each defined by a curved surface indented into the outer surface of the fluid transfer tube.

3. The torque-transfer assembly of claim 2 wherein the curved surface of the first indented fluid groove opposes the inner surface of the shaft to form a sealed fluid transfer passage between the first fluid port and the second fluid port.

4. The torque-transfer assembly of claim 3 wherein a cross-sectional thickness through the fluid transfer tube at the curved surface of the first indented fluid groove is approximately equal to a cross-sectional thickness of the fluid transfer tube at the outer surface.

5. The torque-transfer assembly of claim 1 wherein the shaft includes at least a fifth and a sixth fluid port and wherein the fluid transfer tube includes at least a third indented fluid groove, and wherein the third indented fluid groove is in fluid communication with at least the fifth and the sixth fluid ports.

6. The torque-transfer assembly of claim 5 wherein the third indented fluid groove has a depth and a width substantially the same as the depth and the width of the second indented fluid groove.

7. The torque-transfer assembly of claim 6 wherein the first, second, and third fluid grooves are equally spaced about the circumference of the outer surface of the fluid transfer tube.

8. A torque transfer assembly for communicating fluid between a plurality of fluid ports, the torque transfer assembly comprising:

a shaft having an inner surface that defines a bore, wherein the bore is in fluid communication with the plurality of fluid ports; and a fluid transfer tube disposed in the bore of the shaft, the fluid transfer tube including:

a cylindrical outer surface engaged with the inner surface of the shaft, the outer surface having a plurality of fluid grooves, wherein each of the plurality of fluid grooves is in fluid communication with at least two of the plurality of fluid ports, and wherein a first of the plurality of fluid grooves has a depth and a width different from a depth and a width of at least one other of the plurality of fluid grooves;

an inner surface that defines a central passage coaxial with the cylindrical outer surface;

a first end that defines a first opening that communicates with the central passage; and a second end that defines a second opening that communicates with the central passage, and wherein fluid communicates through the plurality of fluid grooves between the plurality of fluid ports.

9. The torque transfer assembly of claim 8 wherein the plurality of fluid grooves includes three fluid grooves disposed at equal distances apart around the circumference of the fluid transfer tube at the outer surface.

10. The torque transfer assembly of claim 9 wherein a thickness of the fluid transfer tube at the three fluid grooves is substantially the same as a thickness of the fluid transfer tube at the outer surface.

11. The torque transfer assembly of claim 8 wherein a length of each individual groove of the plurality of fluid grooves is at least equal to a distance between the plurality of fluid ports that communicates with the individual groove.

12. The torque transfer assembly of claim 8 wherein each of the plurality of fluid ports is in fluid communication with only one of the plurality of fluid grooves.

13. The torque transfer assembly of claim 8 wherein the fluid transfer tube is under compressive strain from the inner surface of the shaft.

14. The torque transfer assembly of claim 8 wherein the plurality of fluid grooves cooperates with the inner surface of the shaft to communicate fluid between the plurality of fluid ports.

15. The torque transfer assembly of claim 8 wherein the plurality of fluid grooves includes three fluid grooves, and wherein each of the three fluid grooves is in fluid communication with two of the plurality of fluid ports.

* * * * *